March 11, 1969    D. L. CALHOUN    3,431,773
METHOD AND APPARATUS FOR LEAK TESTING
Filed July 12, 1966
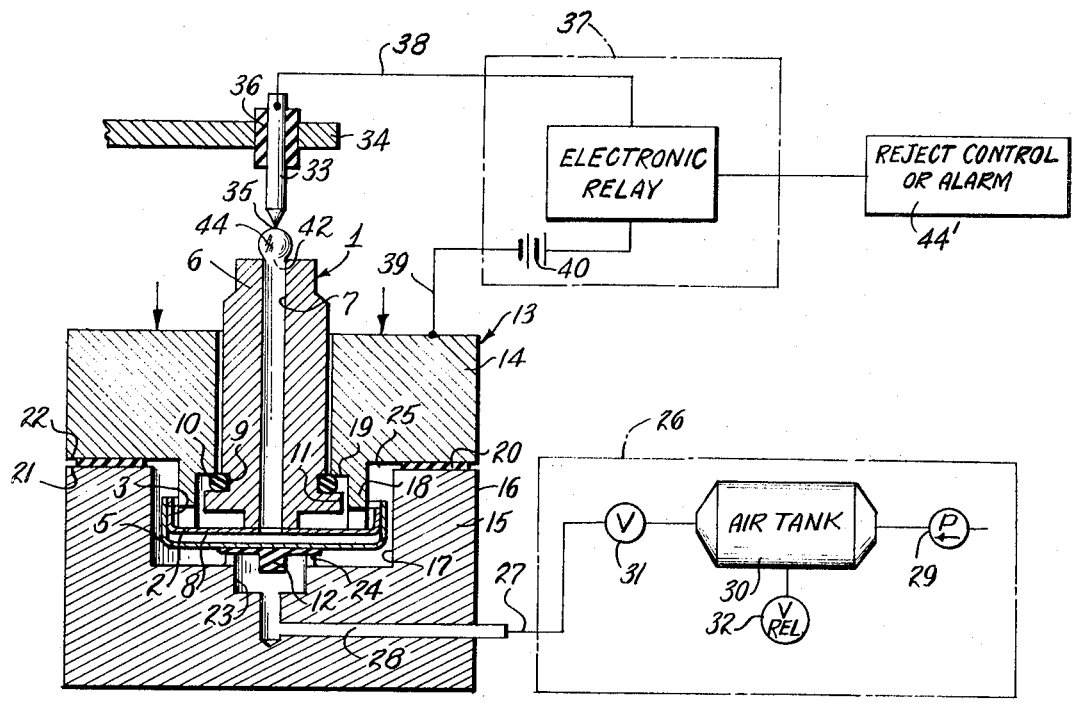
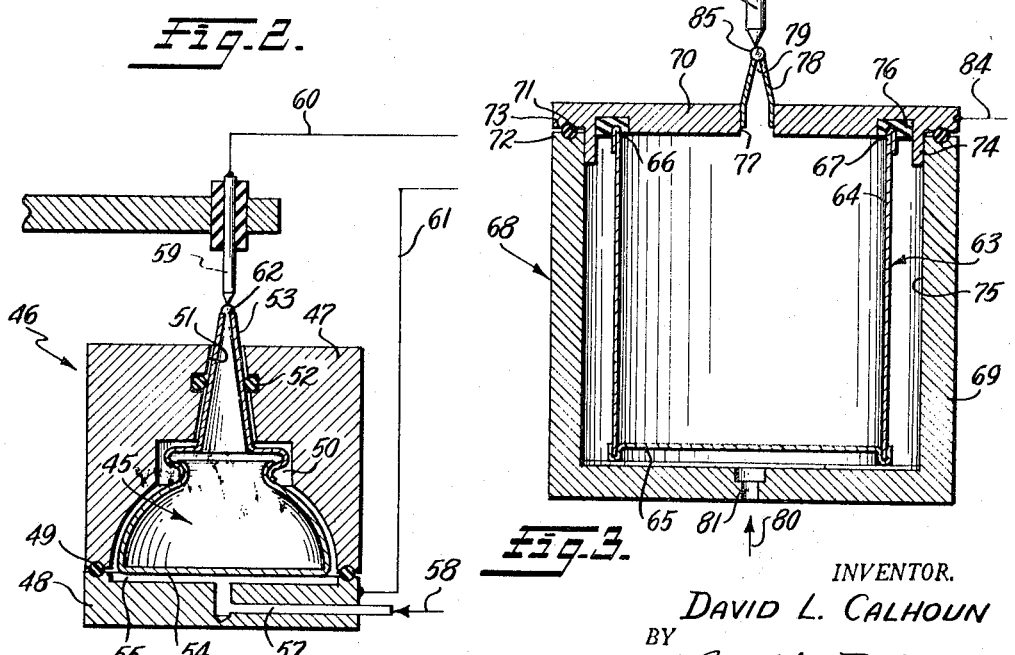
INVENTOR.
DAVID L. CALHOUN
BY Arnold & Roylance
ATTORNEYS March 11, 1969  D. L. CALHOUN  3,431,773
METHOD AND APPARATUS FOR LEAK TESTING
Filed July 12, 1966

INVENTOR.
DAVID L. CALHOUN
BY Arnold & Roylance
ATTORNEYS

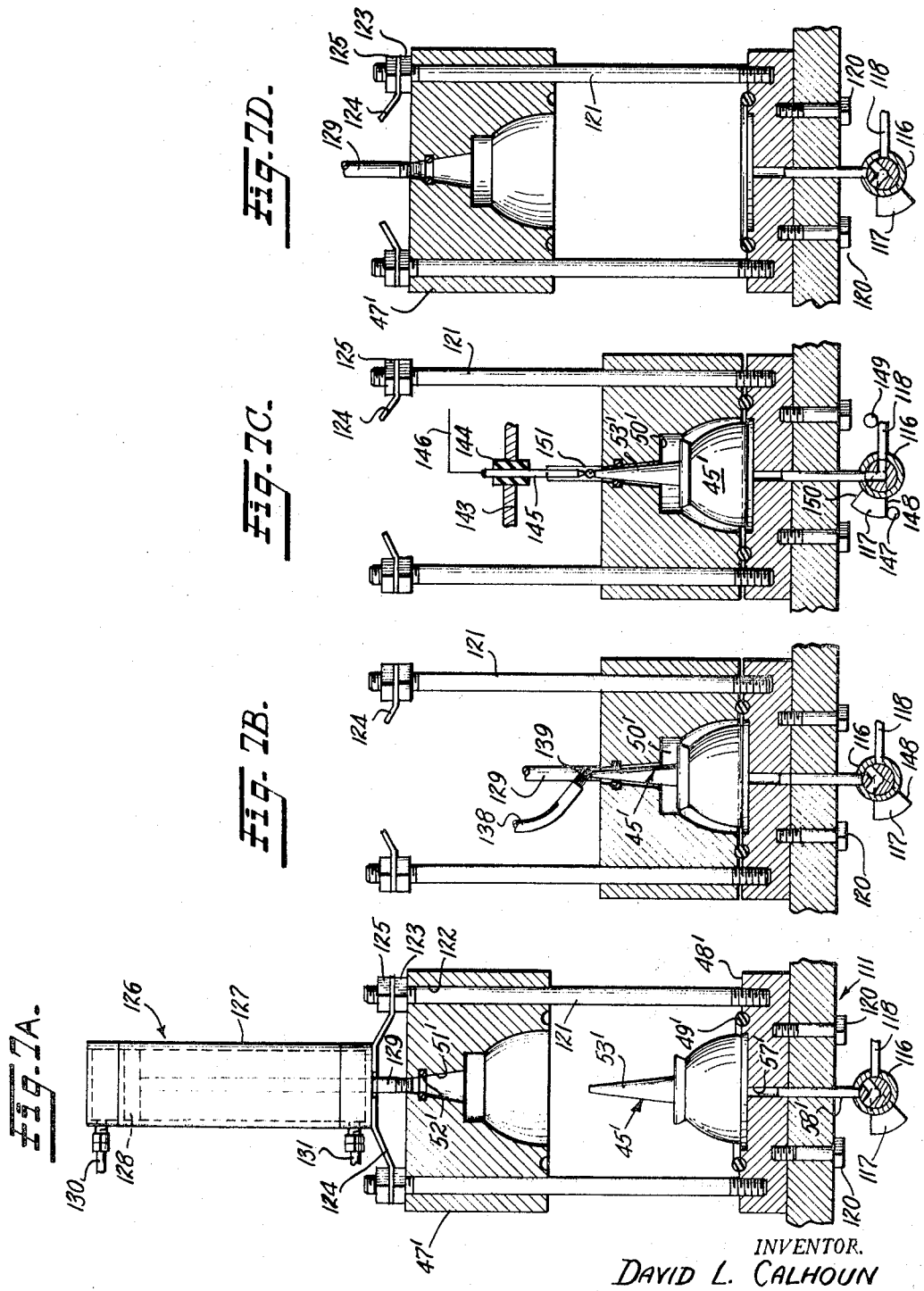

United States Patent Office 3,431,773
Patented Mar. 11, 1969

3,431,773
METHOD AND APPARATUS FOR LEAK TESTING
David L. Calhoun, P.O. Box 143,
Youngwood, Pa. 15697
Filed July 12, 1966, Ser. No. 564,624
U.S. Cl. 73—49.2               6 Claims
Int. Cl. G01m 3/04

ABSTRACT OF THE DISCLOSURE

An automated testing device to rapidly test containers for leaks. Fluid under pressure is applied to the outside of the container and a defective container is detected by sensing leakage into the container. The sensing arrangement includes a closure sealed to the container and having a small opening capable of retaining an electrically conductive liquid film thereon. An electrode is positioned closely adjacent the small opening. An electrical detecting device detects changes in the conductivity of the circuit including the electrode and conductive liquid, conduction through the circuit indicating a defective or leaky container.

---

This invention relates generally to the testing of containers to detect leaks and particularly to an improved method and apparatus for detecting leaky containers.

More specifically, the invention relates to an improved method of testing, and apparatus for performing the method, which avoids the complicated equipment and detecting apparatus formerly used for detecting leaky containers, and which is extremely reliable in operation.

The preferred mode of testing in accordance with this invention is to confine a container to be tested within a test chamber. The test chamber is provided with an opening through which a narrow spout or tip portion of the container under test extends. This tip or spout has an opening which communicates with the interior of the container. The test chamber includes a seal which seals against the spout or other outside surface of the container to provide a fluid-tight space between a portion of the exterior of the container and the test chamber. Fluid pressure is then applied to this fluid-tight portion of the test chamber. If the container is defective, fluid leaks into the container and is detected by a sensing device associated with the opening of the spout or tip of the container.

In one preferred embodiment, such detecting is accomplished by applying a film of bubble forming liquid (such as the liquids used by children to blow "soap bubbles") across the small opening of the spout or tip of the container and then sensing whether or not a soap bubble forms. If there is a leak in the wall of the container, pressure fluid leaking into the container will distend the film o fliquid at the spout to indicate that the container leaks. On the other hand, if no bubble forms, the container is sound. Alternatively, where the container opening is too large to be bridged by the liquid film, the test chamber or its associated apparatus includes a closure to close or plug the larger opening in the container. The closure has an opening or spout of sufficiently small diameter to be bridged by the bubble liquid.

The invention also has utility in the testing of containers filled with a fluid under pressure such as aerosol type dispensers. In the testing of these containers, it is merely necessary to confine the container, or a desired portion of the container, in an enclosure. The enclosure is provided with an opening to which the bubble film is applied. Leakage from the container distends the bubble film to indicate a defective container.

In the arrangement where the container under test has a spout or tip with an opening therein, the test results are independent of the soundness of the test chamber. This occurs because the detecting device only senses fluid which leaks into a defective container and hence, any pressurized fluid which leaks out of the test chamber, through a defective seal, for example, does not affect the accuracy of the detecting apparatus.

In the preferred mode of testing in accordance with this invention, the bubble liquid is electrically conductive and an electrode is at a position slightly spaced from the spout of the container. One side of an electronic sensing circuit is connected to the electrode and the other side of the circuit is electrically connected to the container spout. If the container under test is defective, a bubble forms and bridges the gap between the electrode and the spout. This activates the sensing circuit which in turn operates a defective container alarm or operates a reject mechanism to automatically reject a leaky container.

Although the invention is shown and described with regard to a container formed from electrically conductive material, it will be apparent that containers of electrically insulating material may also be tested with equal reliability by utilizing detecting devices such as a light-operated photocell or perhaps, a capacitance device to sense distention of the bubble film.

Numerous other advantages and features of the method and apparatus of this invention, including a production line system of testing containers, will become apparent with reference to the drawings in which:

FIG. 1 is a view in veritcal section of one embodiment of the apparatus for testing containers in accordance with this invention, with the source of fluid pressure and the electrical circuits shown in schematic form;

FIG. 2 is a view in vertical section showing the testing of a different type of container;

FIG. 3 is a view in vertical section showing a test arrangement particularly adapted to test containers having a large opening;

FIG. 7 is a partial view showing the several steps of testing performed by the apparatus of FIG. 6, with portions of the apparatus in vertical section and portions in schematic for purposes of clarity.

FIGS. 7A–7D are each partial views showing apparatus and the several steps of testing respectively at the stations A–D of FIG. 6, with portions of the apparatus in vertical section and portions in schematic for purposes of explanation.

Figure 4:
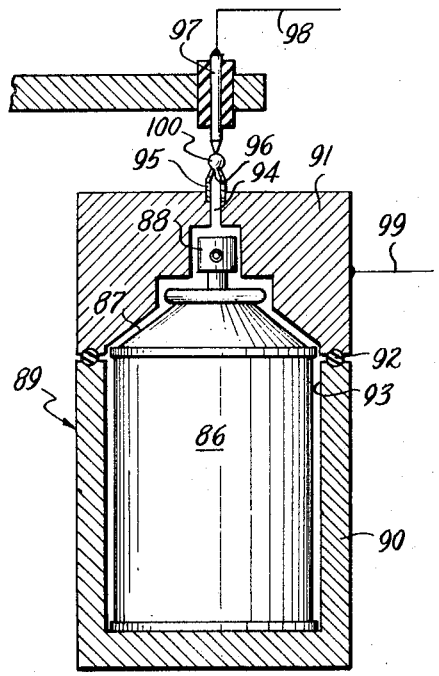
FIG. 4 is a view in vertical section of one preferred apparatus for testing containers having a pressure fluid therein.

Referring now to the drawings in detail and particularly to FIG. 1, there is shown an apparatus for performing a leak detecting test on containers in accordance with this invention. The apparatus of FIG. 1 is particularly adapted to test a diaphragm assembly 1 of the type used in temperature measuring equipment. Diaphragm assembly 1 includes a first thin flexible metal diaphragm 2 having upturned side edges 3 secured as by soldering or welding to the upturned side edges of a second metal diaphragm 5. Secured to the center of first diaphragm 2, by soldering or welding, is an upstanding metal spout 6 having a central opening 7 which communicates with space 8 between diaphragms 2 and 5. Near its bottom, spout 6 is provided with an annular groove 9 to receive a resilient seal in the form of an O-ring 10, the lower portion of the O-ring seating on an enlarged flange portion 11 of spout 6. Diaphragm assembly 1 also has a centrally located stud 12 fixed to the bottom face of diaphragm 5 at a location generally centrally thereof.

The test assembly of FIG. 1 is seen to include a metal test receptacle 13 comprised of a first or upper part 14 and a second or lower part 15. Lower portion 15 has an upstanding peripheral wall 16 which defines a cylindrical cavity 17 therein. Upper portion 14 of the receptacle is so constructed that it has a central opening 17' to receive spout 6 and a skirt 18 which projects downwardly into cavity 17 from a transverse annular shoulder 19 which faces toward lower portion 15 of the recetpacle. Opening 17' is so dimensioned that shoulder 19 engages O-ring 10, as shown in FIG. 1, to seal against the O-ring. An annular seal is provided between the mating faces of upper portion 14 and lower portion 15 of the receptacle by a seal ring 20 disposed between flat annular end face 21 of wall 16 and flat face 22 of upper portion 14.

At the bottom of cavity 17 is a cylindrical bore 23 to accommodate the end of stud 12 of the diaphragm assembly. Spaced about the edge of bore 23 and projecting upwardly are a plurality of spaced apart spacing lugs 24 which engage the bottom face of stud 12 to support the diaphragm assembly when placed in the receptacle.

As is apparent in view of the foregoing description, test receptacle 13 is specially designed to test diaphragm assembly 1. It will be observed with reference to FIG. 1 that upper portion 14 of the receptacle seals against lower portion 15 at seal ring 20 and that upper portion 14 also seals against spout 6 at O-ring 10. Hence, there is defined without receptacle 13 by the walls of the receptable and a portion of the diaphragm assembly under test, a sealed chamber 25. It will also be observed with reference to FIG. 1 that the exterior surface of the portion of diaphragm assembly 1 below O-ring 10 is confined within chamber 25.

A fluid pressure supply source 26 communicates with chamber 25 via supply line 27 and a passage 28 formed in lower portion 15 of the receptacle, passage 28 communicating with bore 23 of the receptacle. Fluid pressure source 26 includes a pump 29 which supplies compressible fluid (preferably air) under pressure to storage tank 30. Flow of air from storage tank 30 to chamber 25 is controlled by a control valve 31 in supply line 27. A pressure relief valve 32, connected to storage tank 30, limits the pressure of air which is supplied to chamber 25 and is preset to maintain the pressure in the chamber at a value less than that which would cause damage to the delicate diaphragms 2 and 5.

An elongated electrode 33 is mounted in a suitable support 34 in vertical alignment with opening 7 of spout 6. As shown at FIG. 1, tip 35 of the electrode is adjacent the upper end of oepning 7 and is spaced only slightly above the end of the opening. Electrode 33 is insulated from support 34 by an insulating bushing 36 carried by the support. Electrode 33 is connected to a sensing circuit 37 via line 38. The other side of sensing circuit 37 is connected to upper portion 14 of receptacle 13 by line 39. By virtue of the engagement of skirt 13 of upper portion 14, with metal diaphragm 2, spout 6 is electrically connected to line 39. A battery 40 or other suitable source of current is connected in line 39. Sensing circuit 37 may take the form of a very sensitive electronic or electrical relay which is actuated in response to a very small current flow of perhaps several microamperes. Since relays of this type are well known in the art, they will not here be explained in detail.

In operation of the test apparatus of FIG. 1, upper portion 14 of receptacle 13 is removed and diaphragm assembly 1 is positioned on lower portion 15 of the receptacle as shown. Upper portion 14 is then lowered down over spout 6 and held tightly against the lower portion. With the receptacle 13 closed, sealed chamber 25 is defined. A film 42 of distensible electrically conducting liquid is then applied to the upper end of opening 7 of spout 6. When initially applied, film 42 merely bridges the opening to confine the predetermined volume defined by opening 7 and space 8 between the diaphragm. Control valve 31 which is initially closed, is then manipulated to introduce air under pressure to chamber 25. It will be noted that the pressurized air completely surrounds the confined portion of the diaphragm assembly by virtue of support lugs 24 and similarly spaced lugs 43 at the end of skirt 18. If joints 4 and 5' are sound and the diaphragms 2 and 5 do not leak, no air leaks from chamber 25 into the space 8 and opening 7 of spout 6, and hence, the volume of fluid with the space closed by distensible film 42 remains constant and the film does not distend. Thus, the circuit from line 39 to line 38 remains incomplete and the sensing circuit 37 is not actuated. However, if there is a leak in the diaphragm assembly, air from chamber 25 leaks into the inside of diaphragm assembly 1 whereupon the distensible film distends to form a bubble 44.

Bubble 44 bridges the slight space between the end of spout 6 and tip 35 of the electrode. When bubble 44 engages electrode 33, the sensing circuit is completed, at least momentarily before bubble 44 bursts, and current flow of at least momentary duration is sensed by sensing circuit 37. The electronic relay is then actuated which in turn operates a reject control or alarm 44' to indicate a defective diaphragm assembly.

FIG. 2 shows the form of receptacle which is preferably used when testing a container in the form of a metal oil can 45. Metal test receptacle 46 includes an upper portion 47 and a lower portion 48 with a seal ring 49 between the upper and lower portions to seal same together against the loss of fluid. A chamber 50 formed primarily in upper portion 47 accommodates oil can 45 as shown at FIG. 2. Upper portion 47 of receptacle 46 has a tapered opening which communicates with chamber 50. Disposed within opening 51 is a seal in the form of an O-ring 52 which engages the external surface of spout 53 of oil can 45. Bottom 54 of oil can 45 seats on a slotted base 55 of lower portion 48. Seal ring 49 and O-ring 52 are so positioned and upper and lower portions 47 and 48 are so dimensioned that when receptacle 46 is closed as at FIG. 2 with oil can 45 therein, the portion of oil can 45 below the point of engagement with O-ring 52 is confined in fluid tight relation within chamber 50.

Lower portion 48 of receptacle 46 is provided with a passage 57 which communicates with chamber 50. Passage 57 has connected thereto a flow line 58 which in turn is connected to a source of fluid pressure (not shown at FIG. 2) like fluid pressure source 26 described with regard to FIG. 1. An electrode 59 identical to electrode 33 of FIG. 1 is disposed so that its tip is slightly spaced from the end of spout 53 and is in vertical alignment with the spout. A wire 60 extends from electrode 59 and is connected to one side of a suitable sensing circuit like sensing circuit 37, previously described. The other side of the sensing circuit is connected to lower portion 48 of receptacle 46 by line 61. Since metal oil can 45 sits on metal lower portion 48, it is apparent that spout 53 is electrically connected to one side of the sensing circuit and electrode 59 is electrically connected to the other side of the sensing circuit.

In use of the apparatus of FIG. 2, the procedure is the same as described with regard to FIG. 1. First, a film 62 of distensible liquid having electrically conducting properties is applied across the open end of spout 53. When fluid pressure is then introduced to chamber 50 from line 58 and passage 57, any leak in the oil can will permit the pressure fluid from chamber 50 to leak into the inside of the can, thereby increasing the volume of the fluid in the can and distending the film 62 so that it begins to form a bubble. As previously described, the bubble bridges the gap between the electrode and the end of the container under test to actuate the sensing circuit.

Turning now to FIG. 3, there is shown a test apparatus for testing a container with a large open mouth. As shown, the container 63 is of the "tin can" type, commonly used to package various products, and includes an upright sidewall 64 having a bottom 65 attached to one end of the sidewall by the common double seaming operation. The upper end of container 63 is open and terminates at an outwardly flared lip 66 which is provided to receive an end closure. Since the open end 67 of container 63 is too large to be bridged by a typical distensible film, a unique test receptacle 68 is provided to test containers of this type. Test receptacle 68 includes a lower portion 69 which is generally cylindrical and has a cylindrical cavity therein and a cover portion 70 arranged to fit over the lower portion in sealing engagement therewith. In this regard, observe seal ring 71 disposed between mating surfaces 72 and 73, respectively, of lower portion 69 and cover 70. Cover 70 is generally flat and is provided with a downwardly depending skirt 74 which extends into cylindrical opening 75 of lower portion 69. Skirt 74 assures alignment of cover 70 with lower portion 69. A flat annular seal 76 is fixed to the inner surface of cover 70, the seal being of sufficient radial width to insure engagement with lip 66 of the container when cover 70 is disposed as at FIG. 3. Centrally of cover 70 is an opening 77 provided with a tapered spout 78. The diameter of the opening 79 at the end of spout 78 is relatively small to be easily bridged by a film of distensible liquid.

A pressure supply line 80 communicates with a passage 81 formed in lower portion 69 of the test receptacle. An electrode 82 has its tip immediately above the opening 79 at the end of spout 78 and connects to one side of a sensing circuit via line 83. The other side of the sensing circuit is connected to cover 70 by wire 84. Since cover 70 and spout 78 are each of metal, the only gap in the circuit is at the space between the end of spout 78 and the tip of electrode 82. A film 85 of distensible liquid is then applied to the end of spout 78 and fluid under pressure is introduced to the interior of the test receptacle. Since open end 67 of container 63 is closed by seal 71, any flow of fluid into the container must occur through a leak in the container. If there is a leak, the volume of air inside the container 63 increases to distend film 85 to form a bubble which engages electrode 82. If a bubble forms and engages the electrode, the sensing circuit is actuated in the manner previously described to operate either a reject control or a warning signal to indicate the presence of a defective container.

One form of a test arrangement to test a closed container containing a pressure fluid, for example an aerosol can, is shown at FIG. 4. Container 86 has an upstanding body portion with an inwardly tapered upper end 87 and a valve assembly 88 secured to the top of the container. Test receptacle 89 is again horizontally split to provide a lower portion 90 and an upper portion 91 which seats on the lower portion, and a seal ring 92 between the mating parts. The upper and lower portions are each hollowed out to provide a test chamber 93 to receive pressure container 86. Centrally of upper portion 91 is an opening which communicates with test chamber 93. A spout 95 is fixed to the opening 94, the spout having an opening therethrough of sufficiently small diameter to be easily bridged by a film of distensible liquid. Immediately above opening 96 is an electrode 97 connected to one side of a sensing circuit by wire 98. A wire 99 also connects to the other side of the sensing circuit in the manner described in regard to the embodiment of FIG. 1. In the embodiment of FIG. 4, the pressure fluid for testing the container comes from the container itself, if the container leaks. It will be appreciated that a leak from container 86 will distend a liquid film extending across opening 96 to indicate a defective container. It is to be noted with particularity that the walls of chamber 93 are shaped to conform closely to the outline configuration of container 86. This construction provides a relatively small volume of space between the exterior of container 86 and the interior of the test receptacle. Hence, only a very small amount of leakage from container 86 will be sufficient to distend liquid film 100 into engagement with electrode 97 whereupon a defective container will be indicated.

Figure 5:
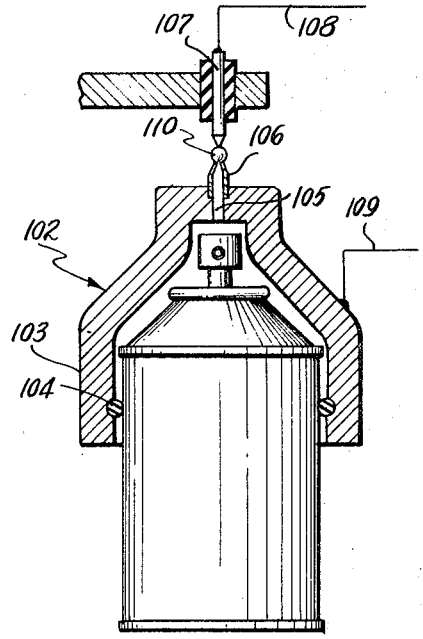
FIG. 5 is a view in vertical section showing an arrangement of apparatus for testing only certain portions of a container having a pressurized fluid therein.

The embodiment of FIG. 5 shows an apparatus for testing only the upper end of a pressure container 86' for leaks. In the manufacture of pressure containers, it is customary for the packager of the pressurized product to buy the body portion and the valve assembly. The container is usually tested by the manufacturer. However, valve assembly 88' is sometimes disturbed during filling, with resultant leaking of the valve assembly. Hence, test apparatus 101 of FIG. 5 is provided to test only the valve assembly after the container is filled with the pressurized product. Observe that the test receptacle 102 is shaped to generally conform to the exterior configuration of the upper end of container 86'. Test receptacle 102 has a depending skirt 103 with a groove therein to retain an annular seal ring 104. At the top of test receptacle 102 is a central opening 105 provided with a spout 106 across which the film of distensible liquid is placed. Electrode 107 is positioned immediately above spout 106 and a wire 108 connects the electrode to one side of a sensing circuit as previously described. The other side of the sensing circuit is connected to receptacle 102 by wire 109. It will be observed with reference to FIG. 5 that test receptacle 102 completely confines the upper end of container 86' when a film 110 of distensible liquid is placed across the end of spout 106.

It is to be appreciated that receptacle 102 of FIG. 5 has particular utility in mass production testing of containers since test receptacle 102 can be easily slipped over container 86' and maintained over the container for a sufficiently length of time to detect even slight leakage from adjacent the valve assembly of the container.

It will be observed with reference to FIGS. 1–3, that the test receptacles for testing the various containers previously described have test chambers, the walls of which are closely adjacent to the exterior of a container to be tested. Such dimensioning of the test chamber insured that the space between the exterior of the container and the walls of the test chamber is maintained at a minimum volume. This minimum volume relationship in the embodiments of FIGS. 1–3 permits use of a fluid pressure source 26 of reasonably low capacity which is inexpensive to maintain and operate.

In the embodiments of FIGS. 4 and 5, the sensitivity of the test apparatus is vastly improved by this minimum volume relationship because only slight leakage of fluid into the small volume between the test receptacle wall and the exterior of the container results in an increase of pressure in the test chamber sufficient to distend the distensible film quite rapidly until it is detected as the result of engagement with the electrode mounted above the test receptacle.

Figure 6:
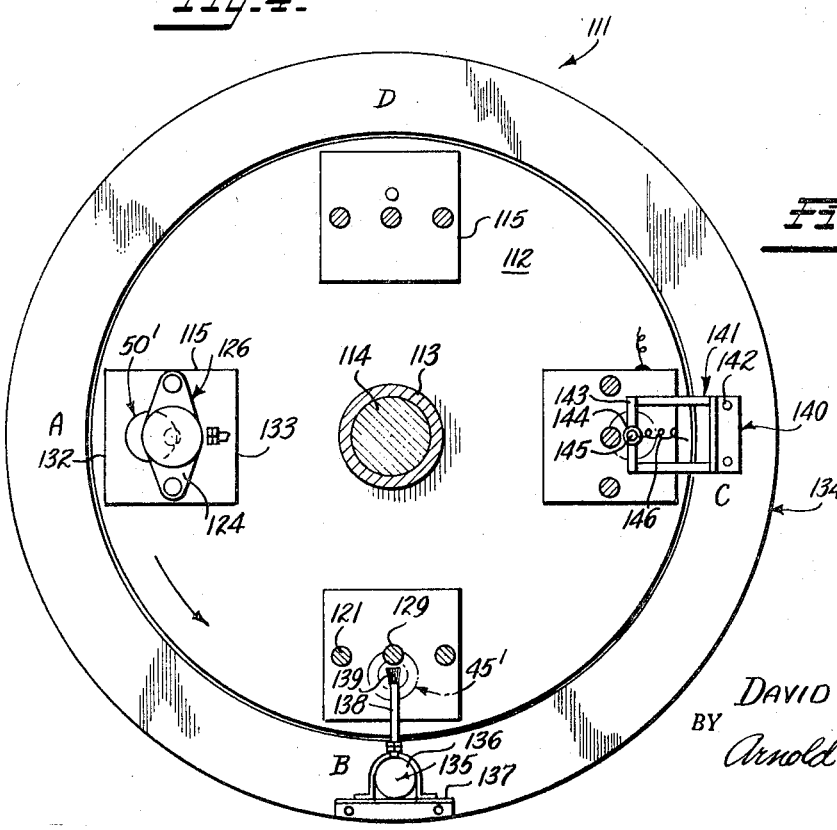
FIG. 6 is a plan view of an apparatus for testing containers on a production line basis.

FIG. 6 shows a mass production system for testing containers. With regard to FIG. 6, it will be noted that the test apparatus 111 includes a flat turret table 112 fixed to a sleeve 113 mounted for rotation about a fixed vertical shaft 114. Mounted at stations A, B, C and D in 90° spaced relation to each other on the upper surface of table 112 are four identical test receptacles 115. FIGS. 7A–7D show a cycle of testing with receptacle 115 at the stations A–D of FIG. 6, in partial vertical section. As will be noted by comparing test receptacle 26 of FIG. 2 with test receptacle 115 of FIGS. 7A–7D, test receptacle 115 is substantialy similar to test receptacle 46 and includes an upper portion 47', a lower portion 48', a seal ring 49' between the upper and lower portions, a tapered opening 51' with an O-ring 52' to receive a spout 53' of an oilcan shaped receptacle 45' which is tested by placing same in chamber 50' of the test receptacle 115. A flow line 58' extends through a suitable opening in table 111 to communicate with a passage 57' in lower portion 48' of test receptacle 115. Although the mass production testing system will be described with regard to the test receptacle 115 which is substantially similar to the test receptacle 46, it is to be understood that the test receptacles like those of FIGS. 1 and 3 can also be used with equally good results and with slight additional modifications, the test receptacles of FIGS. 4 and 5 can also be employed with apparatus 111. Flow line 58' is connected to the outlet of a control valve 116, the movable element of which is operated by an operator 117. One end of a supply line 118 connects to the inlet of valve 116. Air under pressure is supplied to supply line 118 from a suitable fluid pressure source (not shown in FIGS. 7A–7D) such as pressure source 26, FIG. 1. Valve 116 is fixed to table 112 for movement therewith.

As shown at FIG. 7A, lower portion 48 of test receptacle is fixed to table 112 with bolts 120 which extend through the table and are threaded into lower portion 48'. Verticle guide rods 121 for upper portion 47' of test receptacle 115 are fixed to lower portion 48' by threading the rods into the lower portion adjacent the opposite sides thereof. Upper portion 47' is provided with a pair of bores 122 through which rods 121 extend to mount upper portion 47' for sliding movement in alignment with lower portion 48', between the receptacle open position of FIG. 7A and the receptacle closed position of FIG. 7B.

At the upper end of guide rods 121 are nuts 123 which limit the upward movement of upper portion 47' of test receptacle 115. Mounted on the upper end of guide rods 121 is a bracket 124 provided with openings to receive the guide rods, the bracket being secured to the rods with nuts 125. Fixed to the center of bracket 124 is a fluid motor in the form of a pneumatic cylinder assembly 126. Cylinder 126 includes a hollow cylinder 127, a piston 128 slidable therein and a piston rod 129 connected to the piston. The cylinder 126 is mounted on bracket 124 so that the piston rod 129 extends vertically in parallel relation to guide rod 121. The lower end of piston rod 129 is fixed to the geometric-center of the top of upper portion 47 of the test receptacle by threading the end of the rod into a threaded opening formed in upper portion 47' of the receptacle. Flow lines 130 and 131 connected to the upper and lower ends respectively of cylinder 127 supply air to open and close test receptacle 115.

It will be observed with reference to FIG. 6 that the center of test chamber 50' is not at the center of receptacle 115 but is offset in a direction toward the periphery of table 112. By so offsetting chamber 50', the opening 51' of the test chamber is similarly offset toward the front of the test receptacle. This arrangement permits connecting piston rod 129 at the geometric center of the top of the upper portion 47' without interfering with spout 53' of the oilcan under test when it extends through opening 51'. Guide rods 121 are located essentially midway between the front and rear faces 132 and 133 respectively of test receptacle 115.

Surrounding turret table 112 is an annular table 134. Table 134 is fixed to shaft 114 and hence, does not rotate with turret table 112. For convenience of explanation, the portions of annular table 134 at the four receptacles 115 are designated A, B, C and D. Connected to table 112 is a drive mechanism (not shown) which is preferably of the Geneva type which rotates table 112 in 90° increments so that a test receptacle is moved from station A to each of stations B, C and D and is then returned to station A. The drive mechanism is arranged so that test receptacle 115 completely stops at each station to permit completion of a phase of testing at each station.

At station A, an oilcan 45' to be tested, is manually placed in the open receptacle. The drive mechanism is then actuated so that the receptacle is indexed to station B. Mounted on annular table 134 at station B is apparatus 135 for applying a film of distensible liquid to the end of spout 53' of oilcan 45' undergoing test. Apparatus 135 includes a reservoir 136 secured to a bracket 137 which is fixed to annular table 134. Extending from the bottom of reservoir 136 is a flow tube 138 with a brush 139 at the lower end thereof. Distensible liquid film in reservoir 136 flows through tube 138 to brush 139. As shown at FIG. 6, station B and FIG. 7B, brush 139 contacts the tip of spout 53' of an oilcan at station B, whereupon a film of distensible liquid is applied across the opening of spout 53'.

Mounted on table 134 at station C is an electrode assembly 140. Electrode assembly 140 includes a bracket 141 fixed to annular table 134 with bolts 142. As will be observed with reference to FIGS. 6 and 7C, bracket 141 includes a bar 143 disposed directly above the receptacle 115 at station C. Mounted in bar 143 via an insulated bushing 144 is an electrode 145 so disposed that the lower tip of the electrode is spaced slightly above the upper end of spout 53. A wire 146 is electrically connected to the electrode and extends to a suitable electronic relay such as that of sensing circuit 37 previously described with regard to FIG. 1. The other side of the sensing circuit is grounded to turret table 112 to complete the sensing circuit.

At station D, test receptacle 115 is opened and a tested oilcan 45' is removed from the receptacle. Although with the apparatus shown and described, placing an oilcan in the test receptacle at station A and removing same at station D, is accomplished manually, it is to be understood that any of the well known apparatus for accomplishing such placement and removal may be utilized, whereupon the test apparatus would be completely automatic. Since the sensing circuit which is used with the apparatus of FIGS. 6 and 7A–7B is connected to a reject alarm, the operator of the apparatus is signalled that there is a defective container whenever the alarm sounds and hence, can remove and discard the defective container at station D. It is to be understood, however, that automatic apparatus, actuated in response to operation of the sensing circuit when a defective container is detected could also be used to make mass production test apparatus 111 fully automatic.

As shown at FIG. 7C, operation of valve 116 to connect supply line 118 to chamber 50' occurs automatically as test receptacle 115 is indexed to station C. Such automatic actuation of valve 116 is provided for by an ON operating pin 147 fixed to annular table 134. Pin 147 projects into the path of travel of edge 148 of operator 117 of the valve. Hence, as turret table 112 is indexed to move a receptacle from station B to station C, pin 147 engages edge 148 of operator 117 to shift the valve so that supply line 118 communicates with chamber 50'. Since operator 117 and pin 147 are each in a plane behind valve 116, as viewed at FIG. 7C, there is of course no engagement of valve 116 by pin 147 except at edge 148 of operator 117. Also fixed to annular table 134 is an OFF operating pin 149 for valve 116. With reference to FIG. 7C, it will be noted that OFF operating pin 149 is disposed to engage edge 150 of operator 117 to shift valve 116 to the closed position of FIG. 7D as receptacle 115 is moved from station C to station D. Also, OFF operating pin 149 is spaced only slightly from valve operator 117 so that the supply of air from supply line 118 is discontinued in the early stages of movement of the receptacle from station C to station D.

In operation of test apparatus 111 of FIGS. 6 and 7A–7D, an oilcan 45' is placed on lower portion 48' of test receptacle 115, at station A. At station D, upper portion 47' of test receptacle 115 is elevated by cylinder assembly 126 so that oilcan 45' can be easily positioned on lower portion 48'. Turret table 112 is then indexed to move the test receptacle to station B. Flowlines 130 and 131 connected to cylinder assembly 126 are provided with suitable valves which are automatically actuated (in the well known manner) as the table indexes from station A to station B to connect line 130 to a source of pressure air and simultaneously connect line 131 to a suitable exhaust, whereupon piston 128 is driven downwardly to close receptacle 115. With test receptacle 115 closed, spout 53' extends through opening 51' of upper portion 47' and O-ring 52' seals against the outer surface of spout 53' as shown at FIG. 7B. In addition, upper portion 47' seals against lower portion 148' of receptacle 115 at seal ring 49'. Hence, there is defined within receptacle 115, a sealed test chamber 50'. As the oilcan reaches station B, a distensible liquid film is applied to the opening at the end of spout 53' by brush 139.

When the turret table is again indexed to move test receptacle 115 to station C, valve operator 117 is actuated by ON pin 147 so that air under pressure is supplied to chamber 50'. With test receptacle 115 at station C, the tip of spout 53' of oilcan 45' is immediately beneath the tip of electrode 145.

The test apparatus 111 is controlled to maintain a test receptacle at station C for a time long enough for a bubble to form at the maximum permissible leakage rate. Hence, if with chamber 50' pressurized, oilcan 45' leaks, a bubble such as bubble 151 will form to complete an electric circuit between lower portion 48' of the test receptacle and electrode 145. Since, as previously explained, wire 146 is connected to one side of a sensing circuit and the other side of the sensing circuit is grounded to turret table 112, the circuit to the sensing circuit will be completed to actuate a reject control or alarm such as 44' of FIG. 1. If there is a slight leak at either O-ring 52 or at seal ring 49', it is to be appreciated that the test results will not be adversely affected. Such slight leakage is permissible because, as previously described, the pressure source has a capacity sufficient to supply an excess amount of pressure fluid to the test chamber. Hence, since only leakage into the container 45' causes distention of the distensible film, the test results are independent of minor leakage in the test receptacle.

As test receptacle 115 is indexed from station C to station, D, OFF operating pin 149 engages edge 150 of valve operator 117 and shifts the valve to the position of FIG. 7D whereby supply line 118 is disconnected from chamber 50'. Simultaneously the valve (not shown) which controls the air supply to lines 130 and 131 at cylinder assembly 126 is operated to connect line 130 to exhaust and 131 to a pressure source whereupon upper portion 47' of test receptacle 115 is lifted so that the test receptacle is open at the end of this indexing of the turret table, as shown in FIG. 7D. If the reject alarm is sounded when oilcan 45' is at station C, the operator is apprized of the fact that the oilcan is defective and discards same.

Turret table 112 then indexes so that receptacle 115 is returned to station A, whereupon a new cycle of testing is started. By using several test receptacles as shown at FIG. 6, rapid testing is accomplished since containers to be tested are placed in the receptacles as each receptacle reaches station A and are removed as each receptacle reaches station D.

The distensible film forming liquid can be prepared by mixing a small amount of household detergent or soap with water to form a "soapy" solution. If desired, however, any of the available bubble solutions, such as used by children to blow "soap bubbles," can be used with equally good results. A distinct advantage of using a distensible film of soapy liquid is that there is no need to clean a container such as oilcan 45' after testing, since the residue from the distensible fluid is so slight as to be harmless, even where the tested container is for food packaging.

In view of the foregoing, it will be appreciated that applicant has devised a unique apparatus and mode of testing articles and containers of various shapes, and that numerous changes and departures from the specific apparatus shown and described as well as the specific preferred mode of testing in accordance with this invention can be made without departing from the scope thereof.

I claim:

1. A method of testing a container having a small opening therein for leaks in areas other than at the opening comprising the steps of:
    confining the container to provide a sealed space including a predetermined portion of the exterior wall of the container,
        said step of confining including enclosing said container in a test receptacle while maintaining at least said small opening of the container exposed relative to the test receptacle;
    applying an electrically conductive liquid film to said exposed small opening of said container;
    positioning an electrode at a location closely adjacent said small opening of said container;
    applying pressure fluid to said sealed space;
    said film being capable of movement, in response to pressure changes within said container,
        from a first position relative to said opening,
        to a second position relative to said opening,
        said liquid film engaging said electrode in one of said positions; and
    sensing changes in the electrical conductivity of the circuit including said liquid film and electrode to detect a leaky container.

2. A method of testing containers according to claim 1 wherein said step of sensing includes:
    electrically connecting said electrode and said liquid film to an electrical sensing device; and
    wherein, said liquid film engages said electrode in said second position.

3. A method of testing container according to claim 1 wherein said step of sensing includes:
    electrically connecting said electrode and said liquid film to an electronic relay; and
    which further includes rejecting a defective container.

4. A method of testing a container for leaks in the walls thereof comprising the steps of:
    confining a portion of one side of the wall of the container to be tested to provide a first space;
    confining a portion of the other side of the wall of the container to provide a second space,
        said step of confining including sealing a test receptacle to said another side wall of the container,
        said test receptacle having a small opening therein in direct fluid communication with said second space;
    applying pressure fluid to said first space;
    applying an electrically conductive liquid to said exposed small opening of said test receptacle;
    positioning an electrode at a location closely adjacent said small opening of said container;
    said film, in response to pressure changes in said second space, being capable of movement
        from a first position relative to said opening,
        to a second position relative to said opening,
        said liquid film engaging said electrode in one of said positions; and
    sensing changes in the electrical conductivity of the circuit including said liquid film and electrode to detect a leaky container.

5. Apparatus for detecting leaks in a container containing a fluid under pressure comprising:
    receptacle means to receive a container undergoing testing, said receptacle means including
        wall means defining an enclosure for a container undergoing testing,
        said receptacle means having a small opening of a size to receive an electrically conductive liquid therein, said opening communicating directly with said enclosure;
    means to apply an electrically conductive liquid to said opening said liquid moving relative to said opening in response to pressure changes within said enclosure;
    said receptacle having an electrically conductive portion engaging said electrically conductive liquid, and
    means to sense movement of said liquid relative to said small opening, said means comprising
        an electrode adjacent said receptacle opening in the path of distension of said liquid film, and detecting means electrically connected to said electrode and said electrically conductive portion of said receptacle.

6. Apparatus for detecting leaks in a container comprising, in combination:
  a receptacle adapted to receive a container to be tested said receptacle including
    wall means defining a chamber,
    said wall means having an opening communicating with said chamber, and
    seal means engaging a container under test to isolate the interior of the container from the exterior of the container;
  a source of fluid pressure communicating with said chamber of said receptacle to apply fluid under pressure only to that portion of the container between said seal means and said container,
  closure means in direct fluid communication with the interior of the container
    said closure means having an opening therein of a size to receive an electrically conductive liquid film; and
  means to detect movement of said liquid film as a result of leakage from said chamber to the interior of said receptacle, said means comprising
    an electrode positioned closely adjacent said opening of said closure means;
    an electrical detecting device, and
    means connecting said electrode and said conductive liquid to said detecting device.

References Cited
UNITED STATES PATENTS

| | | | |
|---|---|---|---|
| 1,037,954 | 9/1912 | Miller | 73—49 |
| 1,337,390 | 4/1920 | Coleman | 73—47 |
| 2,387,743 | 10/1945 | Cameron et al. | 73—41 |
| 2,433,043 | 12/1947 | Gray | 73—45.2 |
| 2,738,669 | 3/1956 | Silverman et al. | 73—40 |
| 2,749,743 | 6/1956 | Foster | 73—49.3 |
| 3,174,329 | 3/1965 | Kauffman et al. | 73—40.7 |

LOUIS R. PRINCE, *Primary Examiner.*

J. NOLTON, *Assistant Examiner.*

U.S. Cl. X.R.

73—45.2, 49.3